US010291038B2

(12) United States Patent
Mei et al.

(10) Patent No.: US 10,291,038 B2
(45) Date of Patent: May 14, 2019

(54) PASSIVE EQUALIZATION METHOD AND SYSTEM FOR LITHIUM IRON PHOSPHATE BATTERY PACK

(71) Applicant: Contemporary Amperex Technology Co., Limited, Ningde (CN)

(72) Inventors: Jingyao Mei, Ningde (CN); Jianguo Hu, Ningde (CN); Shilin Huang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 659 days.

(21) Appl. No.: 14/998,099

(22) Filed: Dec. 24, 2015

(65) Prior Publication Data

US 2016/0190829 A1    Jun. 30, 2016

(30) Foreign Application Priority Data

Dec. 25, 2014    (CN) .......................... 2014 1 0825991

(51) Int. Cl.
*H01M 4/58* (2010.01)
*H01J 7/00* (2006.01)
(Continued)

(52) U.S. Cl.
CPC .......... *H02J 7/0016* (2013.01); *H01M 4/5825* (2013.01); *H01M 10/052* (2013.01);
(Continued)

(58) Field of Classification Search
CPC ...... H02J 7/0014; H02J 7/0016; H02J 7/0018; H02J 7/0019; H01M 2010/4271; G01R 31/3658; B60L 11/1866
(Continued)

(56) References Cited

U.S. PATENT DOCUMENTS 7,528,575 B2 *   5/2009  Murakami .........  G01R 31/3835
                                                     320/132
2003/0016023 A1 *  1/2003  Richter .................... G01F 1/06
                                                     324/427
(Continued)

FOREIGN PATENT DOCUMENTS

CN   101882699 A   11/2010
CN   101894208 A   11/2010
(Continued)

OTHER PUBLICATIONS

Office Action dated Dec. 6, 2016 for Japanese Patent Application No. 2015-251683 with English translation.
(Continued)

*Primary Examiner* — David V Henze-Gongola
*Assistant Examiner* — Tarikh Kanem Rankine
(74) *Attorney, Agent, or Firm* — Ladas & Parry, LLP (57) ABSTRACT

The invention discloses a passive equalization method for a lithium iron phosphate battery pack, comprising: determining a voltage range in which a State of Charge can be accurately queried for a cell in the battery pack, and determining a corresponding relation between a voltage at which a State of Charge can be accurately queried and the State of Charge; collecting an open circuit voltage of each cell in a quiescent state; judging whether the open circuit voltage is within the voltage range in which a State of Charge can be accurately queried; if the open circuit voltage is within the voltage range in which a State of Charge can be accurately queried, acquiring the State of Charge of the cell corresponding to the open circuit voltage according to the open circuit voltage and the corresponding relation between a voltage at which a State of Charge can be accurately queried and the State of Charge, and determining equalizing capacity of each cell according to the State of Charge of each cell; calculating equalizing discharge current of each cell accord-
(Continued)

ing to a passive equalization principle, and calculating equalizing discharge time of each cell according to the equalizing capacity and the equalizing discharge current of each cell; and subjecting the battery pack to passive equalization based on the equalizing discharge time of each cell.

13 Claims, 5 Drawing Sheets

(51) Int. Cl.
*H01M 10/42* (2006.01)
*H01M 10/44* (2006.01)
*H01M 10/48* (2006.01)
*H01M 10/052* (2010.01)
*G01R 31/36* (2019.01)
*H02J 7/00* (2006.01)

(52) U.S. Cl.
CPC ....... *H01M 10/441* (2013.01); *H01M 10/482* (2013.01); *H02J 7/0021* (2013.01); *H01M 10/44* (2013.01); *H01M 10/48* (2013.01); *H01M 10/486* (2013.01); *H01M 2010/4271* (2013.01)

(58) Field of Classification Search
USPC ................................ 320/118, 134, 116, 132
See application file for complete search history.

(56) References Cited

U.S. PATENT DOCUMENTS

| | | | | |
|---|---|---|---|---|
| 2004/0135546 A1* | 7/2004 | Chertok | ................ | B60L 11/185 320/118 |
| 2010/0194339 A1* | 8/2010 | Yang | .................... | H02J 7/0016 320/116 |
| 2012/0161707 A1 | 6/2012 | Kim | | |
| 2013/0049698 A1* | 2/2013 | Jung | .................... | H02J 7/0016 320/134 |
| 2013/0088202 A1* | 4/2013 | Kamata | ................ | H02J 7/0016 320/126 |
| 2013/0099746 A1* | 4/2013 | Nork | .................... | B60L 11/1866 320/118 |
| 2013/0113280 A1* | 5/2013 | Yang | .................... | H02J 7/0016 307/19 |
| 2013/0144547 A1 | 6/2013 | Yun et al. | | |
| 2014/0042977 A1* | 2/2014 | Kim | ....................... | H02J 7/0068 320/134 |
| 2014/0049222 A1* | 2/2014 | Moorhead | ............. | H02J 7/0016 320/134 |
| 2014/0077752 A1* | 3/2014 | Barsukov | .............. | H02J 7/0016 320/103 |
| 2014/0225622 A1* | 8/2014 | Kudo | .................... | B60L 3/0046 324/433 |
| 2015/0280294 A1* | 10/2015 | Shin | .................... | H01M 10/625 429/50 |
| 2016/0233696 A1* | 8/2016 | Mei | ....................... | H02J 7/0014 |

FOREIGN PATENT DOCUMENTS

| | | |
|---|---|---|
| CN | 102082452 A | 6/2011 |
| CN | 103548233 A | 1/2014 |
| JP | 2001103614 A | 4/2001 |
| JP | 2001103614 A | 4/2001 |
| JP | 2014217169 A | 11/2014 |
| WO | 2011/118484 A1 | 9/2011 |
| WO | 2011118484 A1 | 9/2011 |
| WO | 2012/160638 A1 | 11/2012 |
| WO | 2012160638 A1 | 11/2012 |
| WO | 2013/021589 A1 | 2/2013 |
| WO | 2013021589 A1 | 2/2013 |

OTHER PUBLICATIONS

Office Action for related Chinese Patent Application 201410825991.7 dated Apr. 25, 2016 and its English translation provided by google translate.
Japanese Patent Office Action for Japanese application 2015-251683 dated Jun. 6, 2017.

* cited by examiner

PASSIVE EQUALIZATION METHOD AND SYSTEM FOR LITHIUM IRON PHOSPHATE BATTERY PACK

CROSS-REFERENCE TO RELATED APPLICATIONS

This application claims the benefit of and priority to Chinese Patent Application No. 201410825991.7 filed on Dec. 25, 2014, the disclosures of which are hereby incorporated in their entireties by reference.

FIELD OF THE INVENTION

The invention relates to the field of lithium ion batteries, and particularly to a passive equalization method and system for a lithium iron phosphate battery pack.

BACKGROUND OF THE INVENTION

A lithium iron phosphate (LFP) battery is an environment-friendly battery. Compared with common lithium batteries, lithium iron phosphate batteries have the advantages of high safety, a long cycle life, fast charging and discharging, less weight at the same energy density, high temperature resistance, etc., and therefore have good application prospects. For example, lithium iron phosphate battery packs may be applied to EV (electric vehicles), ESS (Energy Storage Systems) and the like. The common applications include electric bicycles, electric buses and the like.

A lithium iron phosphate battery pack consists of a plurality of single cells connected in series. There are certain deviations among cells due to the limitations of the technological level, and cells will also have inconsistent capacity attenuation during use along with an increase in the number of charge-discharge cycles and due to the influence from storage time, temperature and the like, thus resulting in different states of charge (SoC) of cells in the same battery pack and the inequalization of cells in the same battery pack. SoC, also known as "remaining charge", represents the ratio (expressed in percentage) of the remaining capacity of a battery after being used for a period of time or left unused for a long time to the capacity in its fully charged state. The value of SoC ranges from 0 to 1, wherein a battery is fully discharged when SoC=0 and fully charged when SoC=1.

Such inequalization of lithium iron phosphate battery packs will reduce the performance of lithium iron phosphate battery packs and shorten the service life of lithium iron phosphate battery packs. Accordingly, lithium iron phosphate battery packs require equalization such that a State of Charge (SoC) difference of each cell in a lithium iron phosphate battery pack is within a certain error range.

SUMMARY OF THE INVENTION

A technical problem to be solved by the invention is to provide a passive equalization method and system for a lithium iron phosphate battery pack, which can improve the performance of the lithium iron phosphate battery pack and prolong the service life of the lithium iron phosphate battery pack.

The invention is realized as follows: a passive equalization method for a lithium iron phosphate battery pack is provided, comprising: determining a voltage range in which a State of Charge can be accurately queried for each cell in the lithium iron phosphate battery pack, and determining a corresponding relation between a voltage at which a State of Charge can be accurately queried and State of Charge; collecting an open circuit voltage of each cell in the lithium iron phosphate battery pack in a quiescent state; judging whether the open circuit voltage is within the voltage range in which a State of Charge can be accurately queried; if the open circuit voltage is within the voltage range in which a State of Charge can be accurately queried, acquiring the State of Charge of the cell corresponding to the open circuit voltage according to the open circuit voltage and the corresponding relation between a voltage at which a State of Charge can be accurately queried and the State of Charge, and determining equalizing capacity of each cell according to the State of Charge of each cell; wherein the equalizing capacity of each cell is equal to a difference between capacity of each cell and a minimum value among capacities of all cells in the lithium iron phosphate battery pack; and the capacity of the cell is equal to a product of rated capacity of the cell and a State of Charge value of the cell; calculating equalizing discharge current of each cell according to a passive equalization principle, and calculating equalizing discharge time of each cell according to the equalizing capacity and the equalizing discharge current of each cell; and subjecting the lithium iron phosphate battery pack to passive equalization based on the equalizing discharge time of each cell.

Further, the subjecting the lithium iron phosphate battery pack to passive equalization comprises: comparing average voltage of the battery pack with a preset voltage threshold; subjecting cells having an equalizing discharge time of more than 0 in the lithium iron phosphate battery pack to discharge equalization if the average voltage of the lithium iron phosphate battery pack is greater than the preset voltage threshold; and not performing passive equalization on the lithium iron phosphate battery pack if the average voltage of the lithium iron phosphate battery pack is smaller than the voltage threshold.

Further, the calculating equalizing discharge time of each cell comprises: detecting temperature of the lithium iron phosphate battery pack; and, if the temperature of the lithium iron phosphate battery pack is higher than a temperature setting value, adjusting the longest duration of single equalization startup and the suspension time of two adjacent equalizations of each cell.

Further, the method further comprises: judging whether the equalizing discharge time of each cell is 0 at a predetermined time interval; ending equalization if the equalizing discharge time of all cells is 0; otherwise, if the equalizing discharge time of some cells in the lithium iron phosphate battery pack is not 0, updating the equalizing discharge time of each cell according to actual discharge time of each cell, and then subjecting the lithium iron phosphate battery pack to passive equalization based on the updated equalizing discharge time of each cell.

Further, the method further comprises: judging, at a predetermined time interval, whether the equalizing discharge time of each cell is 0; ending equalization if the equalizing discharge time of all cells is 0; if the equalizing discharge time of some cells in the lithium iron phosphate battery pack is not 0, judging whether the lithium iron phosphate battery pack is in a quiescent state and whether open circuit voltage collected in real time is within the voltage range in which a State of Charge can be accurately queried, if not, updating the equalizing discharge time of each cell according to actual discharge time of each cell, and then subjecting the battery pack to passive equalization based on the updated equalizing discharge time of each cell; and, if the battery pack is in a quiescent state and the open circuit voltage collected in real time is within the voltage range in which a State of Charge can be accurately queried, acquiring State of Charge of the cell corresponding to the open circuit voltage collected in real time according to the open circuit voltage collected in real time and the corresponding relation between a voltage at which a State of Charge can be accurately queried and the State of Charge, and determining the equalizing capacity of each cell according to the State of Charge of each cell corresponding to the open circuit voltage collected in real time.

The invention further provides a passive equalization system for a lithium iron phosphate battery pack, comprising: a storage module, a collection module, a judgment module, an acquisition module and an equalization module; wherein, the storage module is used for storing a corresponding relation between an open circuit voltage at which a State of Charge can be accurately queried and the State of Charge; the collection module is used for collecting open circuit voltage of each cell in the lithium iron phosphate battery pack in a quiescent state; the judgment module is used for judging whether the lithium iron phosphate battery pack is in a quiescent state, and judging whether the open circuit voltage is within the voltage range in which a State of Charge can be accurately queried; the acquisition module is used for, when the open circuit voltage is within the voltage range in which a State of Charge can be accurately queried, acquiring State of Charge of the cell corresponding to the open circuit voltage according to the open circuit voltage and the corresponding relation between a voltage at which a State of Charge can be accurately queried and State of Charge, and determining equalizing capacity of each cell according to the State of Charge of each cell; wherein the equalizing capacity of each cell is equal to a difference between capacity of each cell and a minimum value among capacities of all cells in the lithium iron phosphate battery pack; and the capacity of the cell is equal to a product of rated capacity of the cell and a State of Charge value of the cell; the acquisition module is also used for calculating equalizing discharge current of each cell according to a passive equalization principle, and calculating equalizing discharge time of each cell according to the equalizing capacity and the equalizing discharge current of each cell; and the equalization module is used for subjecting the lithium iron phosphate battery pack to passive equalization based on the equalizing discharge time of each cell.

Further, the system further comprises an energy consumption circuit connected with each cell; wherein the energy consumption circuit comprises a discharge equalizing resistor, and a switching device connected or disconnected under the control of the equalization module.

Further, the switching device comprises a field effect transistor; one end of the discharge equalizing resistor is electrically connected with a positive electrode of a corresponding cell; the other end of the discharge equalizing resistor is electrically connected with a drain electrode of the field effect transistor; a source electrode of the field effect transistor is electrically connected to a negative electrode of the corresponding cell; and a grid electrode of the field effect transistor is electrically connected to the equalization module.

Further, the equalization module is further used for comparing average voltage of the lithium iron phosphate battery pack with a preset voltage threshold; subjecting cells having an equalizing discharge time of more than 0 in the lithium iron phosphate battery pack to discharge equalization if the average voltage of the lithium iron phosphate battery pack is greater than the preset voltage threshold; and performing no passive equalization on the lithium iron phosphate battery pack if the average voltage of the lithium iron phosphate battery pack is smaller than the voltage threshold.

Further, the judgment module is further used for judging, at a predetermined time interval, whether the equalizing discharge time of each cell is 0; and, when the equalizing discharge time of some cells in the lithium iron phosphate battery pack is not 0, notifying the acquisition module to update the equalizing discharge time of each cell according to actual discharge time of each cell.

Further, the judgment module is further used for judging, at a predetermined time interval, whether the equalizing discharge time of each cell is 0; and, when the equalizing discharge time of some cells in the lithium iron phosphate battery pack is not 0, judging whether the lithium iron phosphate battery pack is in a quiescent state and whether open circuit voltage collected in real time is within the voltage range in which a State of Charge can be accurately queried; if not, notifying the acquisition module to update the equalizing discharge time of each cell according to actual discharge time of each cell; if yes, notifying the acquisition module to acquire State of Charge of the cell corresponding to the open circuit voltage collected in real time according to the open circuit voltage collected in real time and the corresponding relation between a voltage at which a State of Charge can be accurately queried and the State of Charge, and to determine the equalizing capacity of each cell according to the State of Charge of each cell corresponding to the open circuit voltage collected in real time.

Further, the collection module is also used for detecting the temperature of the lithium iron phosphate battery pack; and, if the temperature of the lithium iron phosphate battery pack is higher than a temperature setting value, the acquisition module is also used for adjusting the longest duration of a single equalization startup and the suspension time of two adjacent equalizations of each cell.

In a passive equalization method and system for a lithium iron phosphate battery pack according to one embodiment of the invention, the accurate difference in State of Charge serves as a basis for equalization, and the LFP battery pack is subjected to passive equalization when being at a high voltage side, such that the judgment and execution of equalization are not necessarily performed at the same time. Moreover, in the passive equalization method and system for a lithium iron phosphate battery pack according to the embodiment of the invention, the screening of a judgment basis is separated from the execution of an equalization action, thereby improving the reliability of the judgment basis and being capable of executing equalization at any time.

The passive equalization method for a lithium iron phosphate battery pack according to the embodiment of the invention is capable of improving the performance of the LFP battery pack and prolonging the service life of the LFP battery pack.

DETAILED DESCRIPTION OF THE INVENTION

The main concept of the invention is as follows: the accurate difference in State of Charge (SoC) serves as a basis for equalization, and an LFP battery pack is subjected to a passive equalization action when being at a high voltage side; and the screening of a judgment basis for equalization is separated from the execution of an equalization action, such that the judgment and execution of equalization are not necessarily performed at the same time.

To make the technical problems to be solved by the invention and the technical solutions and beneficial effects thereof clearer, the invention will be further described below in detail in conjunction with the accompanying drawings and embodiments. It should be understood that the particular embodiments described herein are only used to explain the invention and not intended to limit the invention.

Figure 1:
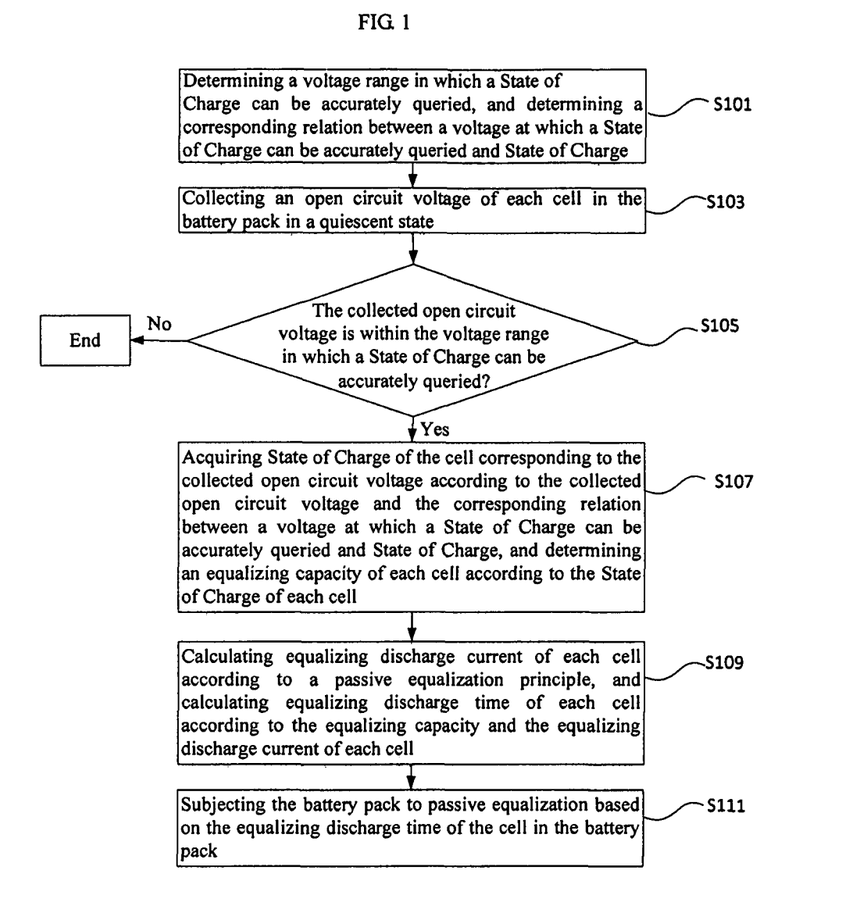
FIG. 1 is a flow chart of a passive equalization method for a lithium iron phosphate battery pack according to one embodiment of the invention.

FIG. 1 is a flow chart of a passive equalization method for a lithium iron phosphate battery pack according to one embodiment of the invention. As shown in FIG. 1, in the embodiment, the passive equalization method for a lithium iron phosphate battery pack may comprise the following steps:

S101: determining a voltage range in which a State of Charge (SoC) can be accurately queried for each cell in the lithium iron phosphate battery pack, and determining a corresponding relation between a voltage at which a State of Charge can be accurately queried and State of Charge.

In one embodiment, the voltage range in which a State of Charge (SoC) can be accurately queried can be decided by a cell characteristic curve, a voltage sampling precision and a State of Charge (SoC) error threshold. An approach to determining the voltage range in which a State of Charge (SoC) can be accurately queried will be briefly described below with reference to FIGS. 2 and 3.

Figure 2:
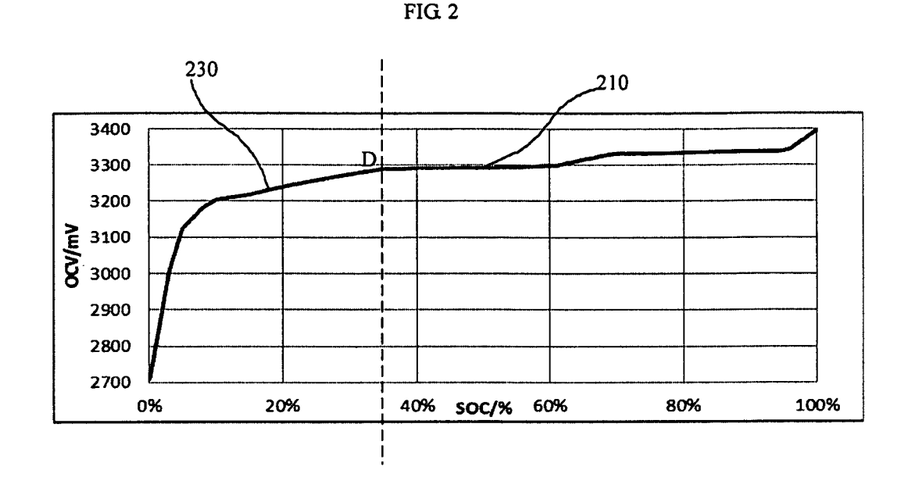
FIG. 2 is a characteristic curve graph of a lithium iron phosphate cell.
Figure 3:
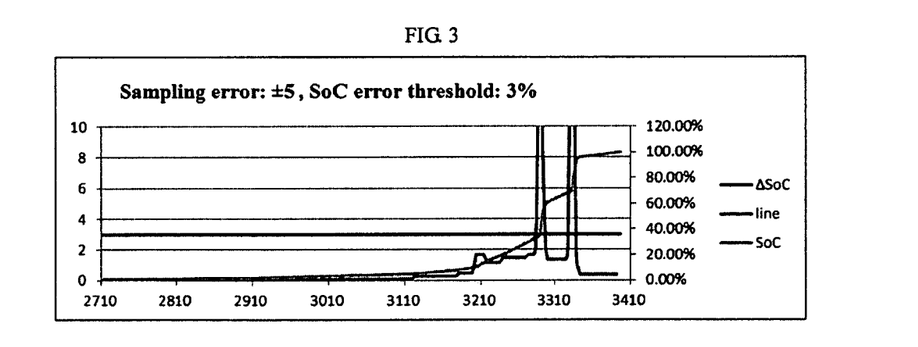
FIG. 3 is a curve graph for determining a voltage range in which a State of Charge can be accurately queried, which curve graph is obtained through analysis in a cell characteristic curve at a voltage sampling precision of ±5 mV and a State of Charge error threshold of 3%.

FIG. 2 is a characteristic curve graph of a lithium iron phosphate cell. FIG. 3 is a curve graph for determining a voltage range in which a State of Charge (SoC) can be accurately queried, which curve graph is obtained through analysis in a cell characteristic curve in FIG. 2 at a voltage sampling precision of ±5 mV and a State of Charge error threshold of 3%. In FIG. 3, "line" represents a desired error threshold. With reference to FIGS. 2 and 3, it can be seen that, within a voltage range from 2710 mV (millivolt) to 3283 mV and a voltage range from 3299 mV to 3317 mV, the value of State of Charge (SoC) may be accurately queried based on open circuit voltage and a corresponding relation between open circuit voltage and State of Charge. Accordingly, a union set of a voltage range from 2710 mV to 3283 mV and a voltage range from 3299 mV to 3317 mV is a voltage range in which a State of Charge (SoC) can be accurately queried. The voltage range in which a State of Charge can be accurately queried can be decided by a cell characteristic curve, a voltage sampling precision and a State of Charge error threshold, and a relation graph of an open circuit voltage at which a State of Charge can be accurately queried and State of Charge can be used to record a corresponding relation between a voltage at which a State of Charge can be accurately queried and State of Charge.

It should be noted that, lithium iron phosphate batteries have similar characteristic curves, and different cell formulations of lithium iron phosphate batteries will change cell characteristic curves and also will result in parameter changes. Accordingly, the above parameters are mainly used for the purpose of exemplary illustration.

In addition, when all cells have the same material, process, etc., the cells also have the same characteristic curve, and therefore have the same voltage range in which a State of Charge can be accurately queried, i.e. all cells in a lithium iron phosphate battery pack can have the same relation graph of an open circuit voltage at which a State of Charge can be accurately queried and State of Charge. In one embodiment, the corresponding relation between a voltage at which a State of Charge can be accurately queried and State of Charge may also be represented by a non-plateau region 230 in FIG. 2.

S103: collecting open circuit voltage of each cell in the lithium iron phosphate battery pack in a quiescent state.

In one embodiment, S103 specifically comprises: judging whether the lithium iron phosphate battery pack is in a quiescent state; and, if the lithium iron phosphate battery pack is in a quiescent state, collecting open circuit voltage of each cell in the lithium iron phosphate battery pack.

In one embodiment, judging whether the lithium iron phosphate battery pack is in a quiescent state can comprise: judging whether the current of the lithium iron phosphate battery pack is less than 0.03 C (coulomb) or less than 3 A (ampere) for more than 30 min (minute); if yes, confirming that the lithium iron phosphate battery pack is in a quiescent state.

S105: judging whether the collected open circuit voltage is within the voltage range in which a State of Charge can be accurately queried; and, if the collected open circuit voltage is within the voltage range in which a State of Charge can be accurately queried, executing S107, otherwise, ending.

S107: acquiring State of Charge of the cell corresponding to the collected open circuit voltage according to the collected open circuit voltage and the corresponding relation between a voltage at which a State of Charge can be accurately queried and State of Charge, and determining equalizing capacity of each cell according to the State of Charge of each cell; wherein the equalizing capacity of each cell is equal to a difference between capacity of each cell and a minimum value among capacities of all cells in the lithium iron phosphate battery pack; and the capacity of the cell is equal to a product of rated capacity of the cell and a State of Charge value of the cell. In one embodiment, said determining equalizing capacity of each cell according to the State of Charge of each cell in S107 can comprise the following steps: acquiring a State of Charge difference of each cell in the battery pack, wherein, the State of Charge difference is equal to a difference between the State of Charge of the cell and the minimum State of Charge, and the minimum State of Charge refers to a minimum value among States of Charge of all cells in the lithium iron phosphate battery pack; and determining equalizing capacity of a corresponding cell according to the State of Charge difference, wherein the equalizing capacity of the cell is equal to a product of rated capacity of the cell and a State of Charge difference of the cell.

If the State of Charge of the $x^{th}$ cell in the lithium iron phosphate battery pack is SoC(x) and a minimum value among States of Charge of all cells in the lithium iron phosphate battery pack is $SoC_{min}$, a difference $\Delta SoC(x)$ between SoC(x) and $SoC_{min}$ is a State of Charge difference of the $x^{th}$ cell in the lithium iron phosphate battery pack, i.e. $\Delta SoC(x)=SoC(x)-SoC_{min}$.

Suppose that the capacity of the $x^{th}$ cell in the lithium iron phosphate battery pack capacity is Cap(x) and the capacity of the $x^{th}$ cell to be equalized is $\Delta Cap(x)$, then $\Delta Cap(x)$ =rated capacity of the $x^{th}$ cell*$\Delta SoC(x)$, wherein the symbol "*" in the equation is multiplication sign.

S109: calculating equalizing discharge current of each cell according to a passive equalization principle, and calculating equalizing discharge time of each cell according to the equalizing capacity and the equalizing discharge current of each cell.

In one embodiment, equalizing discharge current can be calculated according to external voltage and equalizing discharge resistance of each cell, e.g. equalizing discharge current=external voltage/equalizing discharge resistance. The size of equalizing discharge resistance can be decided according to the heat dissipation capability, resistor power, etc. of the lithium iron phosphate battery pack: if the battery pack has better heat dissipation capability or larger power and can accept larger current, smaller equalizing discharge resistance is selected, otherwise, larger equalizing discharge resistance is selected. In one embodiment, it can be estimated that equalizing discharge current=3.3/equalizing discharge resistance.

In other embodiments, an equalizing discharge resistor can be set to be a variable resistor, which can adjust the size of the resistance value under the control of a microcontroller unit (MCU), and therefore can adjust the heat release amount of the equalizing discharge resistor according to the temperature of the lithium iron phosphate battery pack, thereby preventing a further increase in the temperature of the lithium iron phosphate battery pack due to passive discharge equalization. In addition, the longest duration of single equalization startup and the suspension time of two adjacent equalizations can be adjusted according to the actual demand, e.g. the discharge rate is accelerated or reduced. In other words, S109 can further comprise: detecting temperature of the lithium iron phosphate battery pack; and, if the temperature of the lithium iron phosphate battery pack is higher than a temperature setting value, adjusting the longest duration of single equalization startup and the suspension time of two adjacent equalizations of each cell, thereby achieving the purpose of further protecting the cell. The temperature setting value can be set according to the safety requirements of the battery pack.

S111: subjecting the lithium iron phosphate battery pack to passive equalization based on the equalizing discharge time of each cell in the lithium iron phosphate battery pack. Wherein, the step of subjecting the lithium iron phosphate battery pack to passive equalization may comprise the following steps: comparing average voltage of the lithium iron phosphate battery pack with a preset voltage threshold; subjecting Q cell(s) having an equalizing discharge time of more than 0 in the lithium iron phosphate battery pack to discharge equalization if the average voltage of the lithium iron phosphate battery pack is greater than the voltage threshold, wherein Q is a natural number; and performing no passive equalization on the lithium iron phosphate battery pack if the average voltage of the lithium iron phosphate battery pack is smaller than the voltage threshold.

Wherein, the voltage threshold is used for artificially dividing the total voltage of the lithium iron phosphate battery pack into a high voltage side and a low voltage side. Generally, the average voltage of the cell in the lithium iron phosphate battery pack at a knee point between a plateau region and a non-plateau region serves as a voltage threshold, recorded as Vg. If the average voltage of the cell in the lithium iron phosphate battery pack is greater than Vg, it is considered that the lithium iron phosphate battery pack is at the high voltage side, otherwise, at the low voltage side. In one embodiment, the voltage threshold Vg can be determined by the following steps: dividing the cell characteristic curve in FIG. 2 into a plateau region 210 and a non-plateau region 230, and acquiring a knee point voltage recorded as $V_D$ at a knee point D between the non-plateau region 230 and the plateau region 210; and calculating the voltage threshold Vg according to the knee point voltage $V_D$ and offset, wherein voltage threshold Vg=knee point voltage $V_D$ offset.

Wherein, the offset can be calculated according to sampling error, conversion error of State of Charge (SoC), capacity error produced after equalization for a short period of time, etc. In case of a greater offset, the possibility of passive equalization on the lithium iron phosphate battery pack will be reduced, but the safety of the lithium iron phosphate battery pack will be improved. In one embodiment, the offset optionally can be 50 mV.

When the equalizing discharge time of each cell is 0, passive equalization is ended.

In the passive equalization method for a lithium iron phosphate battery pack according to the embodiment of the invention, the accurate difference in State of Charge (SoC) serves as a basis for equalization, and the lithium iron phosphate battery pack is subjected to passive equalization when being at a high voltage side, such that the judgment and execution of equalization are not necessarily performed at the same time. Moreover, in the passive equalization method for a lithium iron phosphate battery pack according to the embodiment of the invention, the screening of a judgment basis is separated from the execution of an equalization action, thereby improving the reliability of the judgment basis and being capable of executing equalization at any time. The passive equalization method for a lithium iron phosphate battery pack according to the embodiment of the invention is capable of improving the performance of the lithium iron phosphate battery pack and prolonging the service life of the lithium iron phosphate battery pack.

Figure 4:
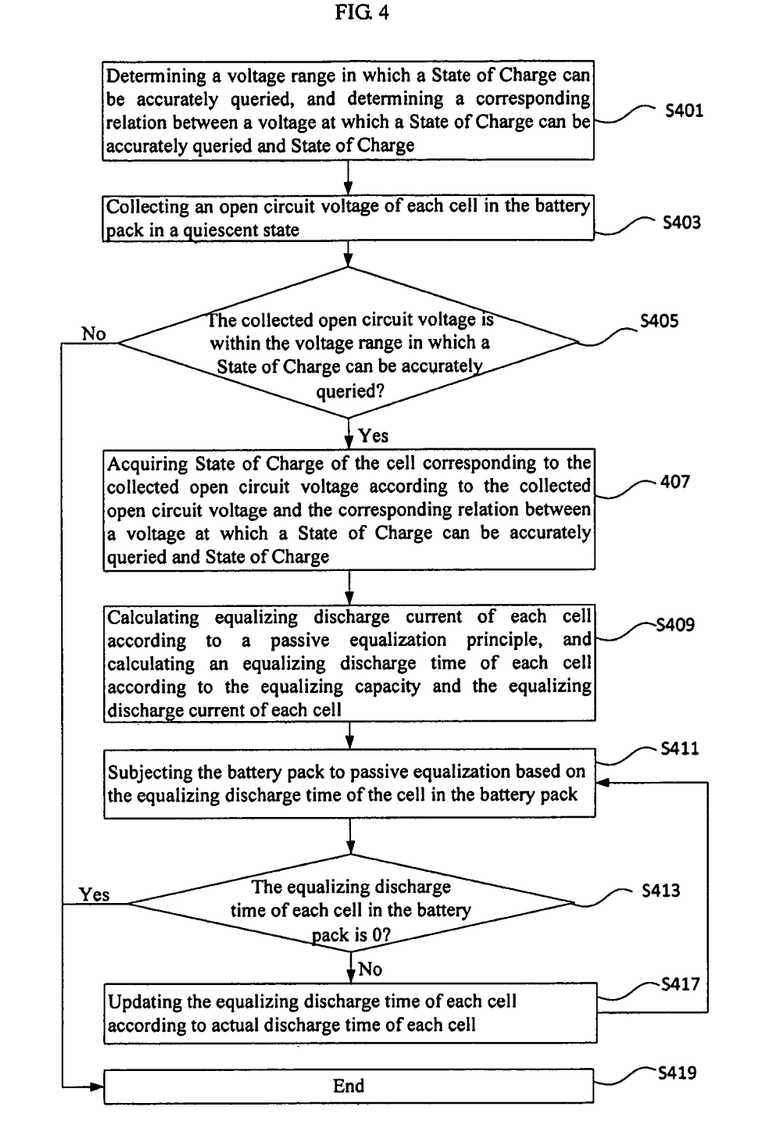
FIG. 4 is a flow chart of a passive equalization method for a lithium iron phosphate battery pack according to another embodiment of the invention.

FIG. 4 is another flow chart of a passive equalization method for a lithium iron phosphate battery pack according to an embodiment of the invention. As shown in FIG. 4, in the embodiment, the passive equalization method for a lithium iron phosphate battery pack may comprise the following steps:

S401-S411, which are the same as the above steps 101-111 and therefore will be no longer described in detail herein;

S413: judging, at a predetermined time interval (e.g. 30 min or 1 h), whether the equalizing discharge time of each cell is 0; and executing S419 if the equalizing discharge time of all cells in the lithium iron phosphate battery pack is 0, otherwise, executing S417 if the equalizing discharge time of some cells in the lithium iron phosphate battery pack is not 0;

S417: updating the equalizing discharge time of each cell according to actual discharge time of each cell, and then executing S411; and S419: ending equalization.

In the passive equalization method for a lithium iron phosphate battery pack according to the embodiment of the invention, updating the equalizing discharge time of each cell according to actual discharge time of each cell can prevent the lithium iron phosphate battery pack from having reduced performance or being damaged due to overdischarge, thereby further improving the performance of the lithium iron phosphate battery pack and prolonging the service life of the lithium iron phosphate battery pack.

Figure 5:
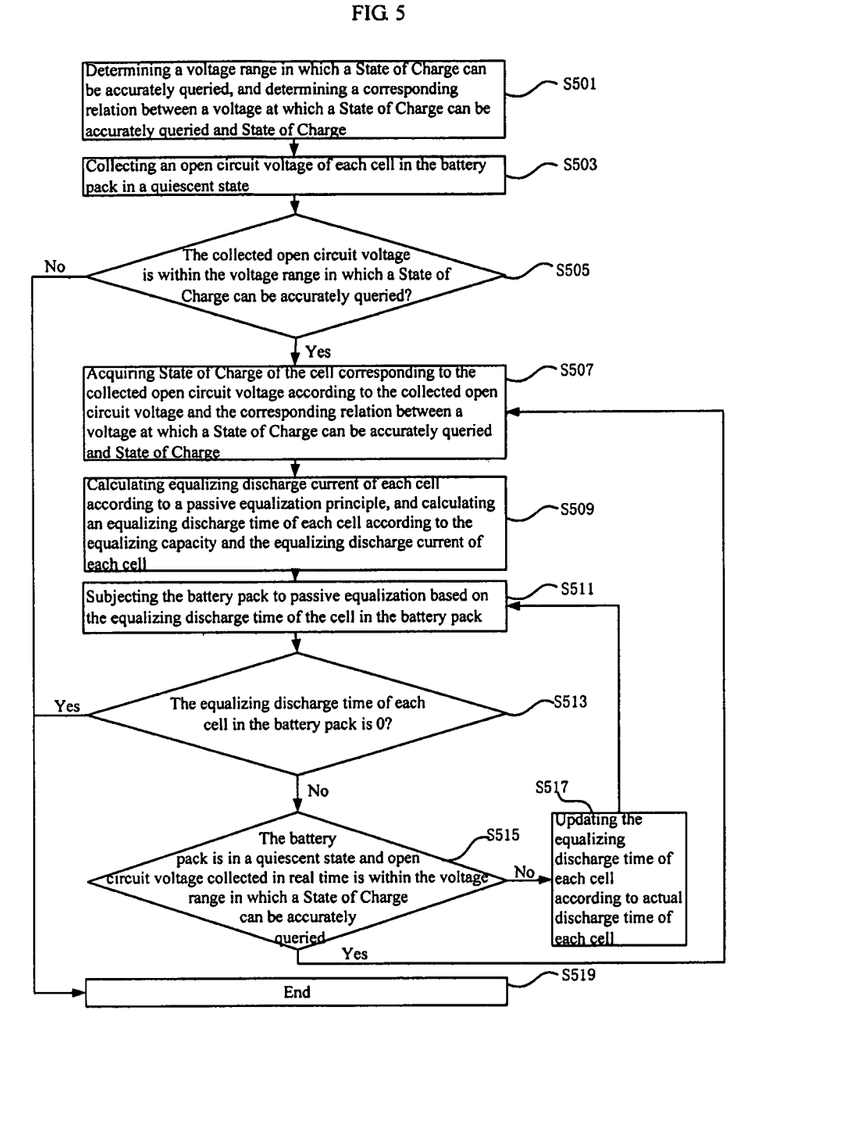
FIG. 5 is a flow chart of a passive equalization method for a lithium iron phosphate battery pack according to another embodiment of the invention.

FIG. 5 is another flow chart of a passive equalization method for a lithium iron phosphate battery pack according to an embodiment of the invention. As shown in FIG. 5, in the embodiment, the passive equalization method for a lithium iron phosphate battery pack may comprise the following steps:

S501-S511, which are the same as the above steps 101-111 and therefore will be no longer described in detail herein;

S513: judging, at a predetermined time interval (e.g. 30 min or 1 h), whether the equalizing discharge time of each cell is 0; and executing S519 if the equalizing discharge time of all cells in the lithium iron phosphate battery pack is 0, otherwise, executing S517 if the equalizing discharge time of some cells in the lithium iron phosphate battery pack is not 0;

S515: judging whether the lithium iron phosphate battery pack is in a quiescent state and whether open circuit voltage collected in real time is within the voltage range in which a State of Charge can be accurately queried; if not, executing S517; if yes, executing S507;

S517: updating the equalizing discharge time of each cell according to actual discharge time of each cell, and then executing S511; and S519: ending equalization.

In the passive equalization method for a lithium iron phosphate battery pack according to the embodiment of the invention, judging at a predetermined time interval (e.g. 30 min or 1 h), and re-determining the equalizing discharge time of each cell according to the corresponding relation between a voltage at which a State of Charge can be accurately queried and State of Charge or updating the equalizing discharge time of each cell according to actual discharge time of each cell can prevent the lithium iron phosphate battery pack from having reduced performance or being damaged due to overdischarge, thereby further improving the performance of the lithium iron phosphate battery pack and prolonging the service life of the lithium iron phosphate battery pack.

The passive equalization method for a lithium iron phosphate battery pack according to the invention will be further described below by means of an example in a specific application scene.

In the specific example, the method comprises the following steps:

step a: collecting voltage of a cell in the lithium iron phosphate battery pack in a real-time manner by a battery management system (BMS), and, in a quiescent state, if the voltage of all cells is within a voltage range in which a State of Charge can be accurately queried, obtaining the State of Charge (SoC) of each cell according to a corresponding relation between a voltage at which a State of Charge can be accurately queried and the State of Charge, wherein the SoC of the $x^{th}$ cell is recorded as SoC(x) (x represents the subscript of the cell, the same below);

step b: selecting a minimum value recorded as $SoC_{min}$ from the State of Charge (SoC) of all cells in the lithium iron phosphate battery pack, and obtaining a State of Charge difference recorded as ΔSoC between the State of Charge of each cell and the minimum State of Charge $SoC_{min}$ according to SoC(x) and $SoC_{min}$, wherein the State of Charge difference of the $x^{th}$ cell is recorded as zSoC(x), i.e. iSoC(x)=SoC(x)−$SoC_{min}$;

step c: obtaining equalizing capacity iCap(x) of each cell to be equalized according to equalizing capacity ΔCap(x) of the $x^{th}$ cell=rated capacity of the $x^{th}$ cell*ΔSoC(x), and recording the equalizing capacity, wherein the rated capacity of each cell is known;

step d: calculating equalizing discharge current of each cell according to a passive equalization principle, and calculating equalizing discharge time of each cell according to the equalizing capacity and the equalizing discharge current of each cell;

step e: artificially dividing the total voltage of the lithium iron phosphate battery pack into a high voltage side and a low voltage side based on a voltage threshold Vg; considering that the lithium iron phosphate battery pack is at the high voltage side if average voltage of the cell in the lithium iron phosphate battery pack is greater than the voltage threshold Vg; otherwise, considering that the lithium iron phosphate battery pack is at the low voltage side if average voltage of the cell in the lithium iron phosphate battery pack is smaller than the voltage threshold Vg;

step f: subjecting Q cell(s) having an equalizing discharge time of more than 0 in the lithium iron phosphate battery pack to discharge equalization if the lithium iron phosphate battery pack is at the high voltage side, wherein Q is a natural number; and performing no passive equalization on the lithium iron phosphate battery pack if lithium iron phosphate battery pack is at the low voltage side;

step g: counting discharge time of each cell during discharge equalization; and step h: judging, every period of time (e.g. 30 min or 1 h), whether the equalizing discharge time of each cell is 0; and ending equalization if the equalizing discharge time of all cells in the lithium iron phosphate battery pack is 0, otherwise, judging whether the lithium iron phosphate battery pack is in a quiescent state and whether open circuit voltage collected in real time is within the voltage range in which a State of Charge can be accurately queried; if not, updating the equalizing discharge time of each cell according to actual discharge time of each cell, and then executing step f; if yes, executing step a.

Figure 6:
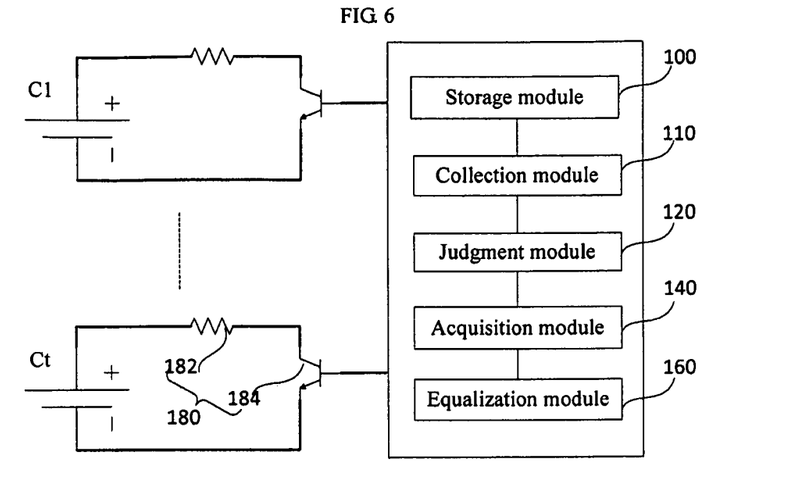
FIG. 6 is a structural schematic diagram of a passive equalization system for a lithium iron phosphate battery pack according to one embodiment of the invention.

FIG. 6 is a structural block diagram of a passive equalization system for a lithium iron phosphate battery pack according to an embodiment of the invention. As shown in FIG. 6, in the embodiment, the passive equalization system for a lithium iron phosphate battery pack may comprise a storage module 100, a collection module 110, a judgment module 120, an acquisition module 140, an equalization module 160, and an energy consumption circuit 180 connected with each cell.

Wherein, the storage module 100 is used for storing a corresponding relation between a voltage at which a State of Charge can be accurately queried and the state of Charge.

The collection module 110 is used for collecting open circuit voltage of each cell in the lithium iron phosphate battery pack in a quiescent state.

The judgment module 120 is used for judging whether the lithium iron phosphate battery pack is in a quiescent state, and judging whether the collected open circuit voltage is within the voltage range in which a State of Charge can be accurately queried.

In one embodiment, the judgment module 120 judges whether the current of the lithium iron phosphate battery pack is less than 0.03 C (coulomb) or less than 3 A (ampere) for more than 30 min (minute); and the judgment module 120 confirms that the lithium iron phosphate battery pack is in a quiescent state if the current of the lithium iron phosphate battery pack is less than 0.03 C (coulomb) or less than 3 A (ampere) for more than 30 min (minute).

The acquisition module 140 is used for, when the collected open circuit voltage is within the voltage range in which a State of Charge can be accurately queried, acquiring State of Charge of the cell corresponding to the collected open circuit voltage according to the collected open circuit voltage and the corresponding relation between a voltage at which a State of Charge can be accurately queried and the State of Charge, and determining equalizing capacity of each cell according to the State of Charge of each cell; wherein the equalizing capacity of each cell is equal to a difference between capacity of each cell and a minimum value among capacities of all cells in the lithium iron phosphate battery pack; and the capacity of the cell is equal to a product of rated capacity of the cell and a State of Charge value of the cell.

The acquisition module 140 is also used for calculating equalizing discharge current of each cell according to a passive equalization principle, and calculating equalizing discharge time of each cell according to the equalizing capacity and the equalizing discharge current of each cell.

The equalization module 160 is used for subjecting the lithium iron phosphate battery pack to passive equalization based on the equalizing discharge time of each cell in the lithium iron phosphate battery pack. In one embodiment, the equalization module 160 is used for comparing average voltage of the lithium iron phosphate battery pack with a preset voltage threshold; subjecting cells having an equalizing discharge time of more than 0 in the lithium iron phosphate battery pack to discharge equalization if the average voltage of the lithium iron phosphate battery pack is greater than the preset voltage threshold; and performing no passive equalization on the lithium iron phosphate battery pack if the average voltage of the lithium iron phosphate battery pack is smaller than the voltage threshold.

The energy consumption circuit 180 is used for consuming charge on the cell by heat generation during passive equalization. In one embodiment, the energy consumption circuit 180 comprises a discharge equalizing resistor 182, and a switching device 184 (e.g. a relay, a field effect transistor, etc.) that can be connected or disconnected under the control of the equalization module 160. Take a cell Ct and the switching device 184 as a field effect transistor in FIG. 6 for example, a positive electrode of the cell Ct is electrically connected with one end of the discharge equalizing resistor 182; the other end of the discharge equalizing resistor 182 is electrically connected with a drain electrode of the field effect transistor 184; a source electrode of the field effect transistor 184 is electrically connected to a negative electrode of the cell Ct; and a grid electrode of the field effect transistor 184 is electrically connected to the equalization module 160. During passive equalization, the equalization module 160 controls the conduction of the field effect transistor 184 such that the energy consumption circuit 180 is closed, thereby allowing the discharge equalizing resistor 182 to generate heat to release electric energy on the cell Ct.

In addition, in one embodiment, the judgment module 120 is further used for judging, at a predetermined time interval (e.g. 30 min or 1 h), whether the equalizing discharge time of each cell is 0; and, when the equalizing discharge time of some cells in the lithium iron phosphate battery pack is not 0, notifying the acquisition module 140 to update the equalizing discharge time of each cell according to actual discharge time of each cell.

In one embodiment, the judgment module 120 is further used for judging, at a predetermined time interval (e.g. 30 min or 1 h), whether the equalizing discharge time of each cell is 0; and, when the equalizing discharge time of some cells in the lithium iron phosphate battery pack is not 0, judging whether the lithium iron phosphate battery pack is in a quiescent state and whether open circuit voltage collected in real time is within the voltage range in which a State of Charge can be accurately queried; if not, notifying the acquisition module 140 to update the equalizing discharge time of each cell according to actual discharge time of each cell; if yes, notifying the acquisition module 140 to acquire State of Charge of the cell corresponding to the open circuit voltage collected in real time according to the open circuit voltage collected in real time and the corresponding relation between a voltage at which a State of Charge can be accurately queried and the State of Charge, and to determine the equalizing capacity of each cell according to the State of Charge of each cell.

In the passive equalization system for a lithium iron phosphate battery pack according to the embodiment of the invention, the accurate difference in State of Charge (SoC) serves as a basis for equalization, and the lithium iron phosphate battery pack is subjected to a passive equalization action when being at a high voltage side, such that the judgment and execution of equalization are not necessarily performed at the same time. Moreover, in the passive equalization system for a lithium iron phosphate battery pack according to the embodiment of the invention, the screening of a judgment basis is separated from the execution of an equalization action, thereby improving the reliability of the judgment basis and being capable of executing equalization at any time. The passive equalization system for a lithium iron phosphate battery pack according to the embodiment of the invention is capable of improving the performance of the lithium iron phosphate battery pack and prolonging the service life of the lithium iron phosphate battery pack. In addition, judging at a predetermined time interval (e.g. 30 min or 1 h), and re-determining the equalizing discharge time of each cell according to the corresponding relation between a voltage at which a State of Charge can be accurately queried and the State of Charge or updating the equalizing discharge time of each cell according to actual discharge time of each cell can prevent the lithium iron phosphate battery pack from having reduced performance or being damaged due to overdischarge, thereby further improving the performance of the lithium iron phosphate battery pack and prolonging the service life of the lithium iron phosphate battery pack.

Figure 7:
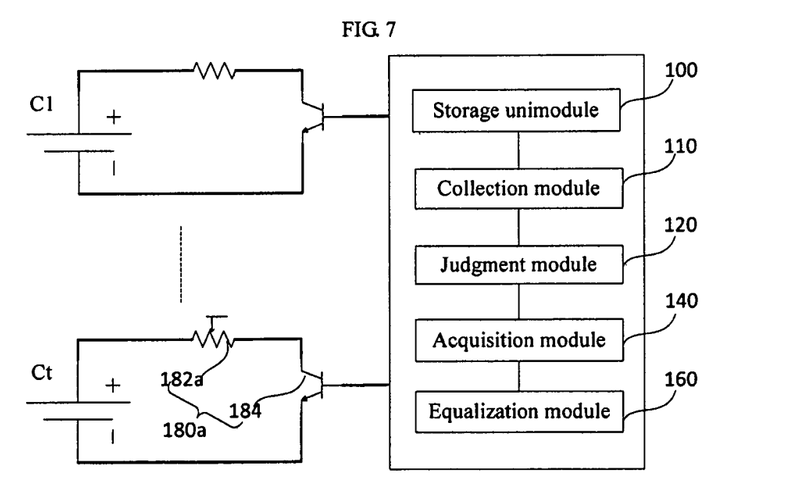
FIG. 7 is a structural schematic diagram of a passive equalization system for a lithium iron phosphate battery pack according to another embodiment of the invention.

FIG. 7 is another structural block diagram of a passive equalization system for a lithium iron phosphate battery pack according to an embodiment of the invention. As shown in FIG. 7, as compared to the embodiment shown in FIG. 6, in the embodiment, a discharge equalizing resistor 182a of an energy consumption circuit 180a in the passive equalization system for a lithium iron phosphate battery pack is a variable resistor, wherein the resistance value of the discharge equalizing resistor 182a can change under the control of the equalization module 160. At this time, the collection module 110 is also used for collecting and detecting temperature of the lithium iron phosphate battery pack; and the equalization module 160 is used for controlling the equalizing discharge resistor 182a to reduce the resistance value when the temperature of the lithium iron phosphate battery pack is higher than a temperature setting value. Since the resistance value of the discharge equalizing resistor 182a can change under the control of the equalization module 160, the heat release amount of the equalizing discharge resistance 182a can be adjusted according to the temperature of the lithium iron phosphate battery pack, thereby preventing a further increase in the temperature of the lithium iron phosphate battery pack due to passive discharge equalization, and the equalizing discharge time can be adjusted according to the actual demand, e.g. the discharge rate is accelerated or reduced.

In addition, in other embodiments, the collection module 110 is also used for collecting and detecting temperature of the lithium iron phosphate battery pack; and the acquisition module 140 is also used for adjusting the longest duration of single equalization startup and the suspension time of two adjacent equalizations of each cell when the collection module 110 detects that the temperature of the lithium iron phosphate battery pack is higher than a temperature setting value.

The above description only refers to preferred embodiments of the invention and is not intended to limit the invention. Any modification, equivalent replacement and improvement, etc. made within the sprit and principle of the invention shall be included within the protection scope of the invention.

The invention claimed is:

1. A passive equalization method for a lithium iron phosphate battery pack, comprising the following steps of: determining a voltage range in which a State of Charge can be accurately queried for each cell in the lithium iron phosphate battery pack, and determining a corresponding relation between a voltage at which a State of Charge can be accurately queried and the State of Charge;
   collecting an open circuit voltage of each cell in the lithium iron phosphate battery pack in a quiescent state;
   judging whether the open circuit voltage is within the voltage range in which a State of Charge can be accurately queried; and, if the open circuit voltage is within the voltage range in which a State of Charge can be accurately queried, acquiring State of Charge of the cell corresponding to the open circuit voltage according to the open circuit voltage and the corresponding relation between the voltage at which a State of Charge can be accurately queried and the State of Charge, and determining an equalizing capacity of each cell according to the State of Charge of each cell; the equalizing capacity of each cell being equal to a difference between a capacity of each cell and a minimum value among capacities of all cells in the lithium iron phosphate battery pack; and the capacity of the cell being equal to a product of a rated capacity of the cell and a State of Charge value of the cell;
   calculating an equalizing discharge current of each cell according to a passive equalization principle, and calculating an equalizing discharge time of each cell according to the equalizing capacity and the equalizing discharge current of each cell; and
   subjecting the lithium iron phosphate battery pack to passive equalization based on the equalizing discharge time of each cell,
   wherein the passive equalization method further comprises:
   judging whether the equalizing discharge time of each cell is 0 at a predetermined time interval,
   when the equalizing discharge time of some cells in the lithium iron phosphate battery pack is not 0, judging whether the lithium iron phosphate battery pack is in a quiescent state and whether open circuit voltage collected in real time is within the voltage range in which a State of Charge can be accurately queried,
   when the lithium iron phosphate battery pack is in a quiescent state and the open circuit voltage collected in real time is within the voltage range in which a State of Charge can be accurately queried, acquiring the State of Charge of the cell corresponding to the open circuit voltage collected in real time according to the open circuit voltage collected in real time and the corresponding relation between a voltage at which a State of Charge can be accurately queried and the State of Charge, and determining the equalizing capacity of each cell according to the State of Charge of each cell corresponding to the open circuit voltage collected in real time.

2. The passive equalization method for a lithium iron phosphate battery pack according to claim 1, wherein the step of subjecting the lithium iron phosphate battery pack to passive equalization comprises:
   comparing an average voltage of the lithium iron phosphate battery pack with a preset voltage threshold;
   subjecting cells having an equalizing discharge time of more than 0 in the lithium iron phosphate battery pack to discharge equalization if the average voltage of the lithium iron phosphate battery pack is greater than the preset voltage threshold; and
   performing no passive equalization on the lithium iron phosphate battery pack if the average voltage of the lithium iron phosphate battery pack is smaller than the voltage threshold.

3. The passive equalization method for a lithium iron phosphate battery pack according to claim 1, wherein the step of calculating equalizing discharge time of each cell comprises: detecting a temperature of the lithium iron phosphate battery pack; and, if the temperature of the lithium iron phosphate battery pack is higher than a temperature setting value, adjusting the longest duration of single equalization startup and the suspension time of two adjacent equalizations of each cell.

4. The passive equalization method for a lithium iron phosphate battery pack according to claim 1, further comprising the following steps of:
   judging, at a predetermined time interval, whether the equalizing discharge time of each cell is 0; ending equalization if the equalizing discharge time of all cells is 0; otherwise, if the equalizing discharge time of some cells in the lithium iron phosphate battery pack is not 0, updating the equalizing discharge time of each cell according to actual discharge time of each cell, and then subjecting the lithium iron phosphate battery pack to passive equalization based on the updated equalizing discharge time of each cell.

5. The passive equalization method for a lithium iron phosphate battery pack according to claim 1, further comprising:
   ending equalization when the equalizing discharge time of all cells is 0.

6. The passive equalization method for a lithium iron phosphate battery pack according to claim 1, further comprising:

when the lithium iron phosphate battery pack is not in a quiescent state and the open circuit voltage collected in real time is not within the voltage range in which a State of Charge can be accurately queried, updating the equalizing discharge time of each cell according to actual discharge time of each cell, and then subjecting the lithium iron phosphate battery pack to passive equalization based on the updated equalizing discharge time of each cell.

7. A passive equalization system for a lithium iron phosphate battery pack, comprising:

a processor; and a memory storing instructions executable by the processor, whereby the processor is configured to:

store a corresponding relation between a voltage at which a State of Charge can be accurately queried and the State of Charge;

collect an open circuit voltage of each cell in the lithium iron phosphate battery pack in a quiescent state;

judge whether the lithium iron phosphate battery pack is in a quiescent state, and judge whether the open circuit voltage is within the voltage range in which a State of Charge can be accurately queried;

when the open circuit voltage is within the voltage range in which a State of Charge can be accurately queried, acquire the State of Charge of the cell corresponding to the open circuit voltage according to the open circuit voltage and the corresponding relation between a voltage at which a State of Charge can be accurately queried and the State of Charge, and determine equalizing capacity of each cell according to the State of Charge of each cell; the equalizing capacity of each cell being equal to a difference between capacity of each cell and a minimum value among capacities of all cells in the lithium iron phosphate battery pack; and the capacity of the cell being equal to a product of a rated capacity of the cell and a State of Charge value of the cell;

calculate an equalizing discharge current of each cell according to a passive equalization principle, and calculate equalizing discharge time of each cell according to the equalizing capacity and the equalizing discharge current of each cell; and subject the lithium iron phosphate battery pack to passive equalization based on the equalizing discharge time of each cell, wherein the memory further contains instructions executable by the processor, whereby the processor is configured to:

judge, at a predetermined time interval, whether the equalizing discharge time of each cell is 0, when the equalizing discharge time of some cells in the lithium iron phosphate battery pack is not 0, judge whether the lithium iron phosphate battery pack is in a quiescent state and whether the open circuit voltage collected in real time is within the voltage range in which a State of Charge can be accurately queried, when the lithium iron phosphate battery pack is in a quiescent state and the open circuit voltage collected in real time is within the voltage range in which a State of Charge can be accurately queried, acquire State of Charge of the cell corresponding to the open circuit voltage collected in real time according to the open circuit voltage collected in real time and the corresponding relation between a voltage at which a State of Charge can be accurately queried and the State of Charge, and determine the equalizing capacity of each cell according to the State of Charge of each cell corresponding to the open circuit voltage collected in real time.

8. The passive equalization system for a lithium iron phosphate battery pack according to claim 7, further comprising an energy consumption circuit connected with each cell;

the energy consumption circuit comprising a discharge equalizing resistor, and a switching device connected or disconnected under the control of the processor.

9. The passive equalization system for a lithium iron phosphate battery pack according to claim 8, wherein the switching device comprises a field effect transistor; one end of the discharge equalizing resistor is electrically connected with a positive electrode of a corresponding cell; the other end of the discharge equalizing resistor is electrically connected with a drain electrode of the field effect transistor; a source electrode of the field effect transistor is electrically connected to a negative electrode of the corresponding cell; and a grid electrode of the field effect transistor is electrically connected to the processor.

10. The passive equalization system for a lithium iron phosphate battery pack according to claim 7, wherein the memory further contains instructions executable by the processor, whereby the processor is configured to compare an average voltage of the lithium iron phosphate battery pack with a preset voltage threshold; subject cells having an equalizing discharge time of more than 0 in the lithium iron phosphate battery pack to discharge equalization if the average voltage of the lithium iron phosphate battery pack is greater than the preset voltage threshold; and not perform passive equalization on the lithium iron phosphate battery pack if the average voltage of the lithium iron phosphate battery pack is smaller than the voltage threshold.

11. The passive equalization system for a lithium iron phosphate battery pack according to claim 7, wherein the memory further contains instructions executable by the processor, whereby the processor is configured to judge, at a predetermined time interval, whether the equalizing discharge time of each cell is 0; and, when the equalizing discharge time of some cells in the lithium iron phosphate battery pack is not 0, update the equalizing discharge time of each cell according to an actual discharge time of each cell.

12. The passive equalization system for a lithium iron phosphate battery pack according to claim 7, wherein the memory further contains instructions executable by the processor, whereby the processor is configured to update the equalizing discharge time of each cell according to actual discharge time of each cell when the lithium iron phosphate battery pack is not in a quiescent state and the open circuit voltage collected in real time is not within the voltage range in which a State of Charge can be accurately queried.

13. The passive equalization system for a lithium iron phosphate battery pack according to claim 7, wherein the memory further contains instructions executable by the processor, whereby the processor is configured to detect a temperature of the lithium iron phosphate battery pack; and, if the temperature of the lithium iron phosphate battery pack is higher than a temperature setting value, adjust a longest duration of a single equalization startup and a suspension time of two adjacent equalizations of each cell.

* * * * *